(12) United States Patent
Moon (10) Patent No.: US 8,945,757 B2
(45) Date of Patent: Feb. 3, 2015

(54) BATTERY PACK HAVING CONDUCTIVE LINE HOLDERS

(75) Inventor: Dea Yon Moon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1036 days.

(21) Appl. No.: 12/491,402

(22) Filed: Jun. 25, 2009

(65) Prior Publication Data

US 2010/0086841 A1    Apr. 8, 2010

(30) Foreign Application Priority Data

Oct. 8, 2008    (KR) ................ 10-2008-0098830

(51) Int. Cl.
*H01M 2/24*    (2006.01)
*H01M 2/20*    (2006.01)
*H01M 10/42*    (2006.01)

(52) U.S. Cl.
CPC .............. *H01M 2/20* (2013.01); *H01M 10/425* (2013.01)
USPC ....................................... 429/160

(58) Field of Classification Search
USPC ................. 429/149, 156, 158, 160, 122, 178; 439/504, 500, 624, 627, 756, 754
See application file for complete search history.

(56) References Cited

U.S. PATENT DOCUMENTS

| 3,980,387 | A | * | 9/1976 | Neidecker ..................... 439/750 |
| 6,146,788 | A | | 11/2000 | Ikeda et al. |
| 6,428,364 | B2 | | 8/2002 | Saito et al. |
| 2009/0176155 | A1 | | 7/2009 | Choi |
| 2009/0246615 | A1 | * | 10/2009 | Park ............................ 429/149 |

FOREIGN PATENT DOCUMENTS

| EP | 1 770 804 | | 4/2007 |
| JP | 46-37145 | U | 12/1971 |
| JP | 57-086263 | U | 5/1982 |
| JP | 9-022644 | A | 1/1997 |
| JP | 3625704 | B2 | 2/2001 |
| JP | 2001-338635 | | 7/2001 |
| JP | 2001-338635 | A | 12/2001 |
| JP | 2003-068272 | A | 3/2003 |

(Continued)

OTHER PUBLICATIONS

Korean Notice of Allowance dated Oct. 25, 2010 for Korean Patent Application No. 10-2008-0098830.

(Continued)

*Primary Examiner* — Raymond Alejandro
(74) *Attorney, Agent, or Firm* — Knobbe, Martens, Olson & Bear, LLP (57) ABSTRACT

A battery pack including: a plurality of battery cells; conductive tabs, each of which has a first portion electrically connected to at least one of the battery cells, and a second portion extending from the first portion; conductive lines electrically connected to the second portions of the conductive tabs; and a protective circuit module electrically connected to the conductive lines. Each of the conductive tabs includes a conductive line holding portion formed at the second portion, to fix the corresponding conductive line. Due to this constitution of the battery pack, the conductive lines are prevented from entirely escaping from the area of solder joints with the conductive tabs, after being disconnected from the solder joints. Therefore, the conductive lines do not come into contact with the battery cells or circuits of the protective circuit module.

10 Claims, 4 Drawing Sheets

(56) References Cited

FOREIGN PATENT DOCUMENTS

| | | |
|---|---|---|
| JP | 2003-263976 A | 9/2003 |
| JP | 2006-134801 A | 5/2006 |
| JP | 2007-335113 | 12/2007 |
| JP | 2007-335113 A | 12/2007 |
| JP | 2008-146854 A | 6/2008 |
| KR | 2006-0028175 A | 3/2006 |
| KR | 10-0635732 B1 | 10/2006 |

OTHER PUBLICATIONS

Japanese Office Action dated Sep. 25, 2012 for Japanese Patent Application No. JP 2009-223118 which shares priority of Korean Patent Application No. KR 10-2008-0098830 with captioned U.S. Appl. No. 12/491,402.

* cited by examiner

BATTERY PACK HAVING CONDUCTIVE LINE HOLDERS

CROSS-REFERENCE TO RELATED APPLICATION

This application claims the benefit of Korean Patent Application No. 10-2008-0098830, filed on Oct. 8, 2008, in the Korean Intellectual Property Office, the disclosure of which is incorporated herein, by reference.

BACKGROUND OF THE INVENTION

1. Field of the Invention

Aspects of the present invention relate to a battery pack.

2. Description of the Related Art

Battery packs are widely used in portable electronic devices, such as notebook computers, personal digital assistants (PDAs), and camcorders. A typical battery pack includes a set of battery cells, due to the limited capacity of an individual battery cell.

Specifically, a battery pack comprises a plurality of rechargeable battery cells, a protective circuit module (PCM), and conductive tabs and conductive lines electrically connecting the battery cells and the protective circuit module. The PCM includes a circuit to control the charge/discharge of the battery cells, a circuit to prevent an overcharge/overdischarge of the battery cells, and other circuits.

The conductive tabs and the conductive lines are electrically connected by soldering. Since only portions of conductive wires, which are exposed from the ends of the conductive lines, are soldered to the conductive tabs, there is the risk that the conductive wires may be easily disconnected from the solder joints, when a strong external impact is applied to the battery pack. As a result of the disconnection of the conductive wires, the conductive lines may come into contact with the battery cells or the circuits of the protective circuit module. This contact may cause an electrical short.

In view of these problems, commercially available battery packs include fixing tapes to fix the conductive lines to predetermined areas of battery cells, if the conductive lines become disconnected. However, an electrolyte leaking from the battery cells weakens the adhesive strength of the fixing tapes, making it impossible for the disconnected conductive lines to be stably fixed to the predetermined areas.

SUMMARY OF THE INVENTION

Aspects of the present invention provide a battery pack configured such that a disconnected conductive line is prevented from escaping from the area of a solder joint with a conductive tab and contacting a battery cell or a circuit of a protective circuit module, thereby preventing an electrical short.

An exemplary embodiment of the present invention provides a battery pack comprising: a plurality of battery cells; conductive tabs, each of which has a first portion electrically connected to at least one of the battery cells, and a second portion extending from the first portion; conductive lines electrically connected to the second portions of the conductive tabs; and a protective circuit module electrically connected to the conductive lines. Each of the conductive tabs includes a conductive line holding portion formed at the second portion, to fix the corresponding conductive line.

According to another aspect of the present invention, each of the conductive lines may include a conductive wire and an insulating sheath surrounding the conductive wire and exposing both ends of the conductive wire.

According to another aspect of the present invention, the conductive line holding portion may include an extension extending from an end of the second portion of the conductive tab, side walls extending from opposing sides of the extension, and fixing protrusions protruding from the side walls, toward one another.

According to another aspect of the present invention, the insulating sheath may be positioned between the fixing protrusions.

According to another aspect of the present invention, the distance between the fixing protrusions may be smaller than the diameter of the insulating sheath.

According to another aspect of the present invention, the distance between the fixing protrusions may be from 60% to 85% of the diameter of the insulating sheath.

According to another aspect of the present invention, the distance between the side walls may be equal to the diameter of the insulating sheath.

According to another aspect of the present invention, the conductive line holding portion may include an extension extending from an end of the second portion of the conductive tab, and tapered walls extending from opposing sides of the extension, which gradually increase in thickness, according to distance from the extension.

According to another aspect of the present invention, the distance between the ends of the tapered walls may be smaller than the diameter of the insulating sheath.

According to another aspect of the present invention, the conductive line holding portion may include an extension extending from an end of the second portion of the conductive tab, and side walls extending upwardly from opposing sides of the extension.

According to another aspect of the present invention, the distance between the side walls may be smaller than the diameter of the insulating sheath.

According to another aspect of the present invention, the first portion, the second portion, and the conductive line holding portion, of the conductive tab, may be integrally formed.

According to another aspect of the present invention, the battery pack may further comprise solder joints, each of which is formed by soldering one end of the conductive line to the second portion of the conductive tab.

According to another aspect of the present invention, the battery pack may further comprise insulating tapes, each of which is interposed between the second portion of the conductive tab and the corresponding battery cell.

According to another aspect of the present invention, the first portion of the conductive tab may be in contact with the bottom surface, or the upper terminal-shaped convex surface, of the corresponding battery cell, and the second portion of the conductive tab may be parallel to the side surface of the battery cell.

According to another aspect of the present invention, the battery cells may be cylindrical lithium secondary batteries.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF THE EXEMPLARY EMBODIMENTS

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 1:
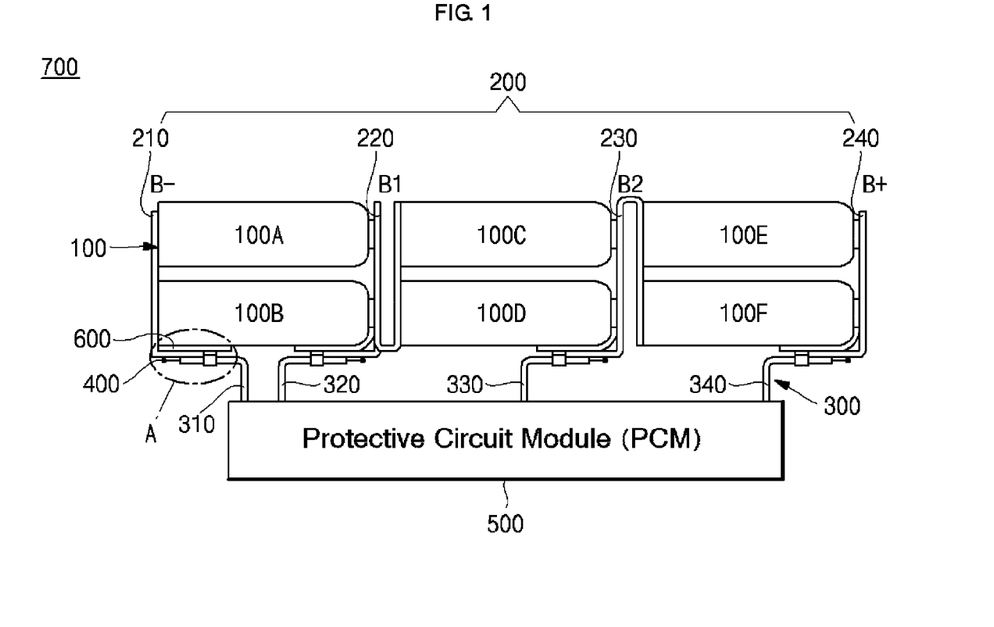
FIG. 1 is a schematic view illustrating the structure of a battery pack, according to an exemplary embodiment of the present invention.
Figure 2:
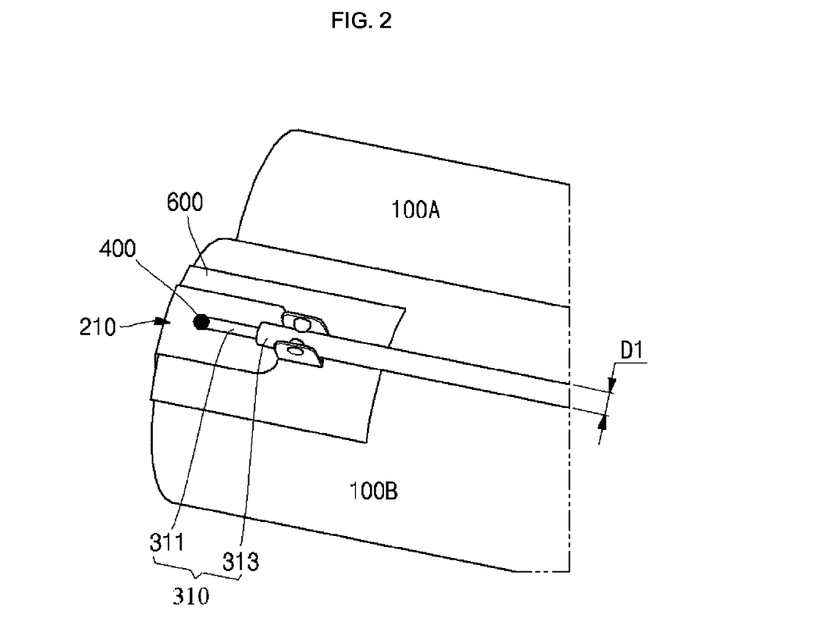
FIG. 2 is a perspective view illustrating portion 'A' of FIG. 1.
Figure 3:
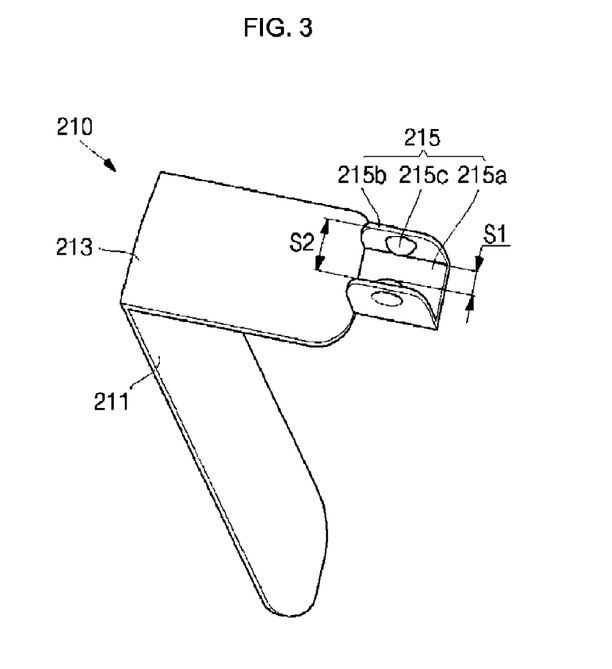
FIG. 3 is an enlarged perspective view illustrating the conductive tab of FIG. 2.

FIG. 1 is a schematic view illustrating the structure of a battery pack 700, according to an exemplary embodiment of the present invention, FIG. 2 is a perspective view illustrating portion 'A' of FIG. 1, and FIG. 3 is an enlarged perspective view illustrating a conductive tab 200 of FIG. 2. Referring to FIGS. 1 through 3, the battery pack 700 comprises a plurality of battery cells 100, the conductive tabs 200, conductive lines 300, solder joints 400, a protective circuit module 500, and insulating tapes 600.

First and second ends of the battery cells 100 have different polarities. In FIG. 1, the first ends are terminal-shaped, convex surfaces that represent positive electrodes, and the second ends are flat surfaces that represent negative electrodes. Herein, it is assumed that the first and second ends of the battery cells 100 are electrically connected to positive and negative electrodes of electrode assemblies (not shown) within the cells, respectively.

As the battery cells 100, cylindrical rechargeable secondary batteries can be used. Cylindrical lithium secondary batteries can be used as the battery cells 100, because such batteries have an operating voltage of up to 3.6 V and a high energy density per unit weight. Six battery cells 100 are shown in FIG. 1, but there is no restriction on the number of the battery cells 100. The battery cells 100 are individually referred to as first to sixth battery cells 100A, 100B, 100C, 100D, 100E, and 100F.

Each of the conductive tabs 200 has a first portion electrically connected to at least one of the battery cells 100, and a second portion connected to at least one of conductive lines 300. Each of the conductive tabs 200 may include a conductive line holding portion, formed on the second portion, to fix the corresponding conductive line 300. The first portion, the second portion, and the conductive line holding portion may be integrally formed. Herein, the first portion is in contact with one of the first and second ends of a corresponding battery cell 100. The second portion extends from the first portion, so as to be parallel to the side surface of the respective battery cell 100.

The conductive tabs 200 may be made of an electrically conductive material selected from, but not limited to, nickel (Ni), copper (Cu), aluminum (Al), and equivalents thereof, to electrically connect the battery cells 100 in series or in parallel. In FIG. 1, the conductive tabs 200 are individually referred to as first to fourth conductive tabs 210, 220, 230, and 240. The first conductive tab 210 is connected to the negative electrodes (i.e. the lowest potential terminals (B−)) of battery cells 100A and 100B. The second and third conductive tabs 220 and 230 are connected to sensing terminals B1 and B2, respectively, to connect four of the battery cells 100 in series and/or in parallel. The fourth conductive tab 240 is connected to the positive electrodes (i.e. the highest potential terminals (B+)) of the battery cells 100E and 100F.

It should, of course, be understood that the number of the conductive tabs 200 increases as the number of battery cells is increased. The structure of the first conductive tab 210 is exemplified to illustrate the structure of the conductive tabs 200.

Referring to FIGS. 2 and 3, the first conductive tab 210 includes a first portion 211 and a second portion 213. The first conductive tab 210 further includes a conductive line holding portion 215 disposed on an end of the second portion 213. The first portion 211 contacts the second ends of the first and second battery cells 100A and 100B, to electrically connect the battery cells 100A and 100B.

The second portion 213 extends from the first portion 211, so as to be parallel to the side surface of the second battery cell 100B. The second portion 213 is electrically connected to the first conductive line 310, through the respective solder joint 400. The second portion 213 has a width sufficient to facilitate the formation of the solder joint 400, without a space limitation.

The conductive line holding portion 215 is formed at an end of the second portion 213, to fix the first conductive line 310 therein. Specifically, the conductive line holding portion 215 includes an extension 215a, side walls 215b, and fixing protrusions 215c.

The extension 215a extends from an end of the second portion 213, and is parallel to the second portion 213. The extension 215a may have a smaller width than that of the second portion 213. The width of the extension 215a may be approximately equal to the diameter D1 of a portion of the first conductive line 310 that is coupled to the conductive line holding portion 215.

The side walls 215b of the conductive line holding portion 215 are bent from the extension 215a and extend from opposing sides of the extension 215a, away from the battery cell 100B. The side walls 215b are substantially perpendicular to the extension 215a. The side walls 215b and the extension 215a define a space where the first conductive line 310 is fixed to the conductive line holding portion 215.

The fixing protrusions 215c protrude from the side walls 215b, so as to face each other. The fixing protrusions 215c prevent the first conductive line 310 from escaping the space, after fixing. The distance S1 between the fixing protrusions 215c is generally smaller than the diameter D1 of the first conductive line 310. For example, the distance S1 may be from about 60% to 85% of the diameter D1 of the first conductive line 310. If the distance is less than about 60% of the diameter D1 of the first conductive line 310, it may be difficult for the first conductive line 310 to pass between the fixing protrusions 215c. If the distance S1 is greater than about 85% of the diameter D1 of the first conductive line 310, the first conductive line 310 may escape from the conductive line holding portion 215, when an external force is applied.

The conductive line 300 is soldered to the second portion of the conductive tab 200. The conductive lines 300 are connected to the protective circuit module 500, which will be explained below, to electrically connect the conductive tabs 200 and the protective circuit module 500. Each of the conductive lines 300 is detachably mounted to the conductive line holding portion of a respective one of the conductive tabs 200. In FIG. 1, the conductive lines 300 are individually referred to as first to fourth conductive lines 310, 320, 330, and 340. The structure of the first conductive line 310 is exemplified to illustrate the structure of all of the conductive lines 300.

Specifically, the first conductive line 310 includes a conductive wire 311, through which current flows, and an insulating sheath 313 surrounding the conductive wire 311 and exposing both ends of the conductive wire 311. The insulating sheath 313 prevents unnecessary shorting between the first conductive tab 210 and the protective circuit module 500. The connection between the conductive line holding portion 215 of the first conductive tab 210 and the first conductive line 310 is exemplified to illustrate the connection between the conductive line holding portions of the conductive tabs 200 and the conductive lines 300. The first conductive line 310 is coupled to the conductive line holding portion 215 of the first conductive tab 210, such that a portion of the insulating sheath 313 passes between the fixing protrusions 215c and is mounted in the space defined by the extension 215a and the side walls 215b.

The distance S1, between the fixing protrusions 215c of the conductive line holding portion 215, is smaller than the diameter D1 of the insulating sheath 313. These dimensions prevent the first conductive line 310 from escaping from the space defined by the extension 215a and the side walls 215b. That is, the first conductive line 310 is prevented from escaping from that area of the solder joint 400, after being disconnected therefrom, because a portion of the first conductive line 310 is fixed by the conductive line holding portion 215. Therefore, the first conductive line 310 does not come into contact with the battery cell 110B, or a circuit of the protective circuit module 500, to prevent electrical shorting therebetween.

The distance S2 between the side walls 215b is equal to the diameter D1 of the insulating sheath 313. With these dimensions, the first conductive line 310 remains in place after being mounted in the space defined by the extension 215a and the side walls 215b, thus ensuring stable soldering of the second portion 213 and the first conductive line 310.

The solder joints 400 are formed by soldering one end of each of the conductive lines 300 (i.e., the conductive wire 311) to the second portions of the conductive tabs 200. The solder joints 400 play a substantial role in electrically connecting the conductive tabs 200 and the conductive lines 300. Although not shown, the solder joints 400 may be formed between the other ends of the conductive lines 300 and the protective circuit module 500, which will be explained below.

The protective circuit module 500 is electrically connected to the battery cells 100, through the conductive lines 300 and the conductive tabs 200. The protective circuit module 500 may include a circuit (not shown) for charging/discharging the battery cells 100, a protective circuit (not shown) for preventing overcharging or over-discharging of the battery cells 100, a connector (not shown) installed for the electrical connection with an external set, a charger, etc., on an insulating substrate.

The insulating tapes 600 are interposed between the second portions of the conductive tabs 200 and the side surfaces of the battery cells 100. Specifically, the insulating tapes 600 are interposed between the second portions of the first to fourth conductive tabs 210, 220, 230, and 240, and the side surfaces of the battery cells 100. The insulating tapes 600 prevent heat, which is generated during soldering the first to fourth conductive tabs 210, 220, 230 and 240 to the ends of the conductive lines 300, from damaging the battery cells 100. The insulating tapes 600 electrically insulate the conductive tabs 200, which are connected to the positive electrodes of the battery cells 100, from the side surfaces of the battery cells 100, which act as negative electrodes.

The conductive lines 300 can be prevented from entirely escaping from the areas the solder joints 400, after being disconnected therefrom, because portions of the conductive lines 300 are fixed by the conductive line holding portions 215. Therefore, the conductive lines 300 do not come into contact with the battery cells 100, or the circuits of the protective circuit module 500. This prevents electrical shorting between the conductive lines 300 and the battery cells 100 and/or the protective circuit module 500.

The conductive lines 300 can be locked to the conductive line holding portions 215, in comparison with conventional battery packs using fixing tapes, whose adhesive strength is weakened by an electrolyte leaking from battery cells. Moreover, material costs in the related art, associated with the use of fixing tapes, can be reduced without the need for additional processing. Further, the conductive line holding portions 215 are integrally formed with the conductive tabs 200, thus reducing material costs, and eliminating the need for additional processing associated with the use of fixing tapes.

Figure 4:
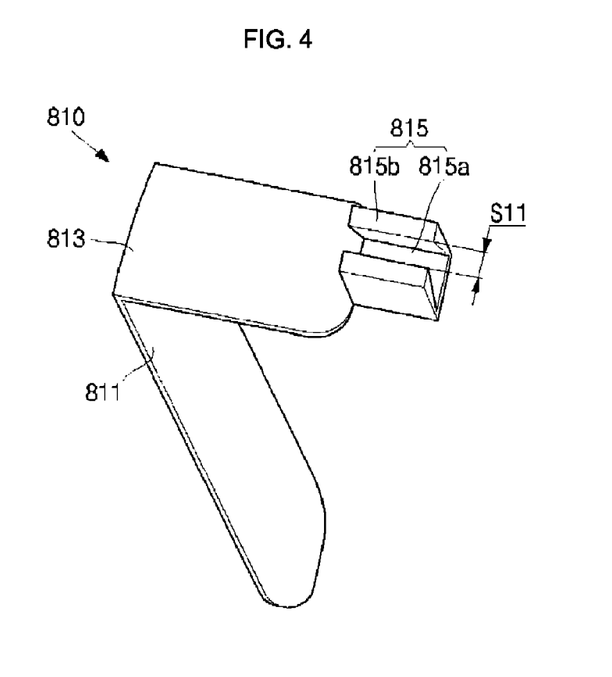
FIG. 4 is an enlarged perspective view illustrating a conductive tab, which is structurally different from the conductive tab of FIG. 3, according to another exemplary embodiment of the present invention.
Figure 5:
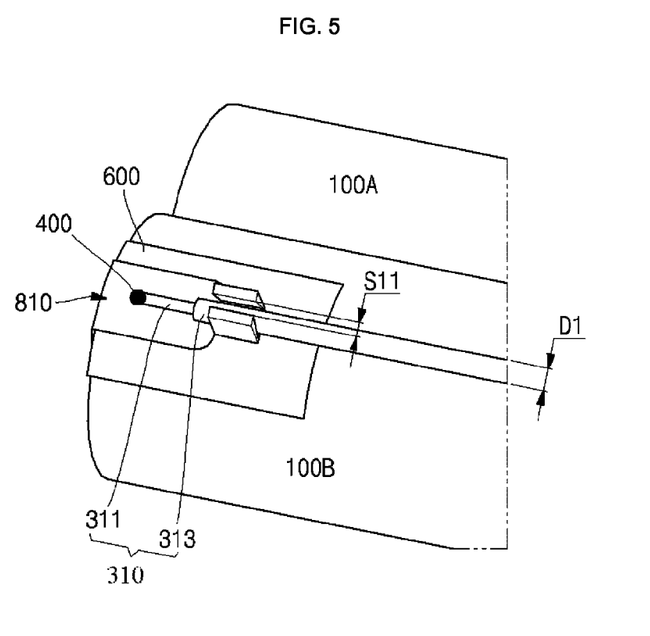
FIG. 5 is a perspective view illustrating a conductive line coupled to the conductive tab of FIG. 4 in a battery pack, according to another exemplary embodiment of the present invention.

FIG. 4 is an enlarged perspective view illustrating a conductive tab, which is structurally different from the conductive tabs 200 of FIG. 3, according to another exemplary embodiment of the present invention. FIG. 5 is a perspective view illustrating a state in which a conductive line is coupled to the conductive tab of FIG. 4, in a battery pack.

The conductive tabs can be used in the battery pack 700, in place of the conductive tabs 200. Thus, the same reference numerals are used to designate similar elements, and a repeated explanation of such elements is omitted. The structure of a first conductive tab 810 is exemplified to illustrate the structure of all the conductive tabs. The connection between the first conductive tab 810 and the first conductive line 310 is exemplified to illustrate the connection between all the conductive tabs and the conductive lines.

Referring to FIG. 4, the first conductive tab 810 includes a first portion 811 in contact with the second surfaces of the first and second battery cells 100A and 100B, and a second portion 813 extending from the first portion 811, so as to be parallel to the side surface of the second battery cell 100B. The first conductive tab 810 includes a conductive line holding portion 815 formed on the second portion 813. The first and second portions 811 and 813 are similar to the first and second portions 211 and 213 of the first conductive tab 210.

The conductive line holding portion 815 is formed at an end of the second portion 813, to fix the conductive line 315 therein. Specifically, the conductive line holding portion 815 includes an extension 815a and tapered walls 815b. The extension 815a has generally the same structure as the extension 215a.

The tapered walls 815b are bent from opposing sides of the extension 815a and gradually increase in width as they extend from the extension 815a. The tapered walls 815b are substantially perpendicular to the extension 815a. The tapered walls 815b, together with the extension 815a, define a space, where the first conductive line 310 is fixed to the conductive line holding portion 815. The tapered walls 815b serve as latches to prevent the release of the first conductive line 310 from the space, after fixing. The distance S11 between the ends of the tapered walls 815b may be smaller than the diameter D1 of the first conductive line 310. For example, the distance S11 may be the same as the distance S1 between the fixing protrusions 215c.

Referring to FIG. 5, the first conductive line 310 is coupled to the conductive line holding portion 815. A portion of the insulating sheath 313 of the first conductive line 310 passes between the tapered walls 815b and is mounted in the space defined by the extension 815a and the tapered walls 815b.

The distance S11 between the tapered walls 815b is smaller than the diameter D1 of the insulating sheath 313. These dimensions prevent the first conductive line 310 from escaping from the space. That is, the first conductive line 310 is prevented from escaping from the area of the solder joint 400, after being disconnected from the solder joint 400, because a portion of the first conductive line 310 is fixed by the conductive line holding portion 815. Therefore, the first conductive line 310 does not come into contact with the battery cell 110B or a circuit of the protective circuit module 500, to prevent electrical shorting therebetween.

The tapered walls 815b surround and tightly fix the first conductive line 310, due to their tapered shape. Therefore, the first conductive line 310 remains fixed after being mounted in the conductive line holding portion 215. This insures stable soldering of the second portion 813 and the first conductive line 310. The fixing of the first conductive line 310 by the tapered walls 815b allows for stronger fixing of the first conductive line 310, than the fixing of the first conductive line 310 by the conductive line holding portion 215.

Figure 6:
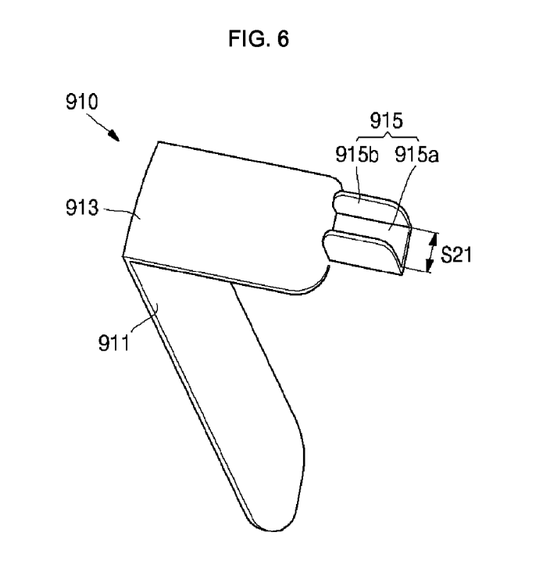
FIG. 6 is an enlarged perspective view illustrating a conductive tab, which is structurally different from the conductive tab of FIG. 3, according to another exemplary embodiment of the present invention.
Figure 7:
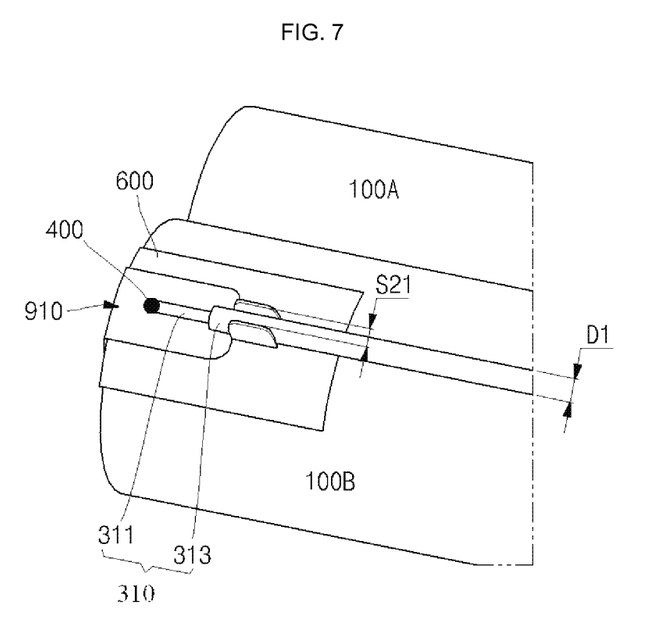
FIG. 7 is a perspective view illustrating a conductive line coupled to the conductive tab of FIG. 6 in a battery pack, according to another exemplary embodiment of the present invention.

FIG. 6 is an enlarged perspective view illustrating a conductive tab, which is structurally different from the conductive tab 210 of FIG. 3. FIG. 7 is a perspective view illustrating a state in which a conductive line is coupled to the conductive tab of FIG. 6, in a battery pack.

The conductive tab of FIGS. 6 and 7 can be used in the battery pack 700, in place of the conductive tabs 200. Thus, the same reference numerals are used to designate similar elements, and a repeated explanation of such elements is omitted. The structure of a first conductive tab 910 is exemplified to illustrate the structure of the conductive tabs. The connection between the first conductive tab 910 and the first conductive line 310 is exemplified to illustrate the connection between the conductive tabs and the conductive lines.

Referring to FIG. 6, the first conductive tab 910 includes a first portion 911 in contact with the second surfaces of the first and second battery cells 100A and 100B, and a second portion 913 extending from the first portion 911, so as to be parallel to the side surface of the second battery cell 100B. The first conductive tab 910 includes a conductive line holding portion 915 formed on the second portion 913. The first and second portions 911 and 913 are similar to the first and second portions 211 and 213 of the first conductive tab 210, and thus, their description is omitted.

The conductive line holding portion 915 is formed at an end of the second portion 913, to fix the first conductive line 310 therein. Specifically, the conductive line holding portion 915 includes an extension 915a and side walls 915b.

The extension 915a has generally the same structure as the extension 215a, except that the extension 915a has a smaller width than that of the extension 215a. That is, the width of the extension 915a is smaller than the diameter D1 of the first conductive line 310.

The side walls 915b have generally the same shape as the side walls 251b of the conductive line holding portion 215, except that the distance S21 between the side walls 915b is smaller than the distance S1 between the side walls 215a, because the side walls 915b extend from the more narrow extension 915a. With these dimensions, the first conductive line 310 may be press-fit into the conductive line holding portion 915.

Referring to FIG. 7, the first conductive line 310 is coupled to the conductive line holding portion 915. A portion of the insulating sheath 313 of the first conductive line 310 is press-fit between the side walls 915b and is mounted in a space defined by the extension 915a and the side walls 915b.

The distance S21 between the side walls 915b is smaller than the diameter D1 of the insulating sheath 313. These dimensions prevent the first conductive line 310 from escaping from the space defined by the extension 915a and the side walls 915b. That is, the first conductive line 310 is prevented from entirely escaping from the area of the solder joint 400, after being disconnected therefrom, because a portion of the first conductive line 310 is fixed by the conductive line holding portion 915. Therefore, the first conductive line 310 does not come into contact with the battery cell 110B, or a circuit of the protective circuit module 500, so as to prevent electrical shorting. The press-fitting of the first conductive line 310 between the side walls 915b of the conductive line holding portion 915 allows for simpler fixing of the first conductive line 310 than the fixing of the first conductive line 310 by the conductive line holding portion 215.

As is apparent from the above description, since portions of the conductive lines are fixed by the conductive line holding portions of the conductive tabs, the conductive lines can be prevented from entirely escaping from the area of the solder joints and contacting the battery cells and/or circuits of the protective circuit module, thereby preventing electrical shorting. In addition, the conductive lines can be locked into the conductive line holding portions, in comparison with conventional battery packs using fixing tapes, whose adhesive strength is weakened by an electrolyte leaking from battery cells. Furthermore, the conductive line holding portions are integrally formed with the conductive tabs, thus reducing material costs and eliminating the need for additional processing associated with the use of the fixing tapes.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:
1. A battery pack comprising:
a plurality of battery cells;
a plurality of conductive tabs, wherein each conductive tab is electrically connected to one of the battery cells, and wherein each conductive tab comprises a conductive line holding portion;
a plurality of conductive lines, wherein a particular conductive line is electrically connected to a particular conductive tab, and wherein the particular conductive line is connected by press fit into the conductive line holding portion of the particular conductive tab, wherein at one or more positions along the particular conductive line, the conductive line holding portion of the particular conductive tab contacts the particular conductive line from substantially three different directions;

a protective circuit module electrically connected to the conductive lines, wherein the particular conductive line is press fit into the conductive line holding portion of the particular conductive tab, wherein the conductive line holding portions each comprise:

extensions extending from ends of the conductive tabs; and side walls extending from opposing sides of the extensions, such that a distance between adjacent side walls is less than a thickness of the conductive lines and decreases with distance from the extensions; and wherein in the event of a solder breakage the particular conductive line is held securely in place.

2. The battery pack according to claim 1, wherein each of the conductive lines comprises a conductive wire, and an insulating sheath surrounding the conductive wire and exposing ends of the conductive wire.

3. The battery pack according to claim 2, wherein a distance between the side walls is less than a diameter of the insulating sheaths.

4. The battery pack according to claim 1, wherein the conductive line holding portion of each conductive tab is integrally formed with the conductive tab.

5. The battery pack according to claim 1, further comprising solder joints connecting the conductive lines to the conductive tabs.

6. The battery pack according to claim 1, further comprising insulating tapes interposed between the conductive tabs and the battery cells.

7. The battery pack according to claim 1, wherein:

the conductive tabs are in contact with a terminal of a corresponding battery cell; and portions of the conductive tabs are parallel to the side surfaces of the corresponding battery cell.

8. The battery pack according to claim 1, wherein the battery cells are cylindrical lithium secondary batteries.

9. A battery pack comprising:

a plurality of battery cells;

a plurality of conductive tabs, wherein each conductive tab is electrically connected to one of the battery cells, and wherein each conductive tab comprises a conductive line holding portion;

a plurality of conductive lines, wherein a particular conductive line is connected by solder to a particular conductive tab, and wherein the particular conductive line is connected by press fit into the conductive line holding portion of the particular conductive tab, and wherein at one or more positions along the conductive line, the conductive line holding portion of the particular conductive tab contacts the particular conductive line from substantially three different directions;

a protective circuit module electrically connected to the conductive lines, wherein the conductive line holding portions each comprise:

extensions extending from ends of the conductive tabs; and side walls extending from opposing sides of the extensions, such that a distance between adjacent side walls is less than a thickness of the conductive lines and decreases with distance from the extensions; and wherein in the event of a solder breakage the particular conductive line is held securely in place.

10. The battery pack of claim 9, wherein each of the conductive tabs is electrically connected to at least one of the battery cells.

* * * * *